(12) United States Patent
Park

(10) Patent No.: US 11,606,457 B2
(45) Date of Patent: Mar. 14, 2023

(54) TECHNOLOGY AND METHOD FOR SELECTIVELY PROVIDING NETWORK FUNCTION TO APPLICATION OF DEVICE

(71) Applicant: Samsung Electronics Co., Ltd., Suwon-si (KR)

(72) Inventor: Jisoon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/961,227

(22) PCT Filed: Jan. 2, 2019

(86) PCT No.: PCT/KR2019/000023
§ 371 (c)(1),
(2) Date: Jul. 9, 2020

(87) PCT Pub. No.: WO2019/139297
PCT Pub. Date: Jul. 18, 2019

(65) Prior Publication Data
US 2021/0067625 A1    Mar. 4, 2021

(30) Foreign Application Priority Data
Jan. 9, 2018    (KR) .................. 10-2018-0002969

(51) Int. Cl.
*H04M 1/72463*    (2021.01)
*G06F 3/04817*    (2022.01)
*G06F 3/0482*    (2013.01)

(52) U.S. Cl.
CPC ...... *H04M 1/72463* (2021.01); *G06F 3/0482* (2013.01); *G06F 3/04817* (2013.01)

(58) Field of Classification Search
CPC ............ H04M 1/72463; G06F 3/04817; G06F 3/0482
See application file for complete search history.

(56) References Cited

U.S. PATENT DOCUMENTS 8,532,627 B1 * 9/2013 Nassimi ............ H04M 3/42153
455/412.2
9,306,899 B1 * 4/2016 Vendrow ................. H04L 51/18
(Continued)

FOREIGN PATENT DOCUMENTS

KR    10-2011-0063951 A    6/2011
KR    10-2014-0001485 A    1/2014
(Continued)

OTHER PUBLICATIONS

International Search Report dated Apr. 1, 2019 in connection with International Patent Application No. PCT/KR2019/000023, 2 pages.
(Continued)

*Primary Examiner* — Ryan F Pitaro

(57) ABSTRACT

Various embodiments of the present invention relate to a method for controlling a network access right for an application in an electronic device, and an electronic device for operating same. A control method for an electronic device comprises the steps of: receiving an input of a command for switching a mode of an electronic device to a blocking mode; and when a command for switching to the blocking mode is input, blocking a network access right of at least one application which has been preselected by a user from among a plurality of applications in the electronic device.

10 Claims, 13 Drawing Sheets

(56) References Cited

U.S. PATENT DOCUMENTS

| | | | |
|---|---|---|---|
| 9,600,441 B2 | 3/2017 | Tungatkar | |
| 9,693,208 B2 | 6/2017 | Warr | |
| 9,948,763 B2 | 4/2018 | Kim et al. | |
| 10,045,177 B2 | 8/2018 | Park et al. | |
| 2008/0254767 A1* | 10/2008 | Jin | H04M 1/667 |
| | | | 455/411 |
| 2009/0170532 A1* | 7/2009 | Lee | H04M 1/72457 |
| | | | 455/456.3 |
| 2011/0141276 A1* | 6/2011 | Borghei | H04W 12/12 |
| | | | 348/143 |
| 2013/0055378 A1* | 2/2013 | Chang | G06F 21/53 |
| | | | 726/17 |
| 2013/0080522 A1* | 3/2013 | Ren | H04L 12/6418 |
| | | | 709/204 |
| 2014/0068755 A1* | 3/2014 | King | G06F 21/53 |
| | | | 726/19 |
| 2014/0089406 A1* | 3/2014 | Gniffke | H04L 67/147 |
| | | | 709/204 |
| 2014/0283142 A1* | 9/2014 | Shepherd | G06F 21/6245 |
| | | | 726/30 |
| 2015/0052466 A1* | 2/2015 | Chun | G06F 3/0484 |
| | | | 715/769 |
| 2015/0237193 A1* | 8/2015 | Zeilingold | H04W 4/50 |
| | | | 455/418 |
| 2016/0044157 A1* | 2/2016 | Chen | H04M 1/72463 |
| | | | 455/418 |
| 2016/0269957 A1 | 9/2016 | Cho et al. | |
| 2016/0373905 A1* | 12/2016 | Warr | H04M 3/436 |
| 2017/0099592 A1* | 4/2017 | Loeb | H04L 67/303 |
| 2017/0147667 A1* | 5/2017 | Boss | G06F 3/04817 |
| 2018/0109671 A1* | 4/2018 | Xuan | H04W 4/027 |
| 2019/0347180 A1* | 11/2019 | Cranfill | G06F 21/629 |
| 2019/0373541 A1* | 12/2019 | Choi | H04W 48/18 |
| 2020/0107292 A1* | 4/2020 | Shin | G06Q 10/1093 |
| 2021/0044693 A1* | 2/2021 | Yu | H04M 1/72463 |

FOREIGN PATENT DOCUMENTS

| | | |
|---|---|---|
| KR | 10-2014-0111590 A | 9/2014 |
| KR | 10-2015-0022460 A | 3/2015 |
| KR | 10-2015-0045639 A | 4/2015 |
| KR | 10-2015-0143246 A | 12/2015 |
| KR | 10-1590626 B1 | 2/2016 |
| KR | 10-1640754 B1 | 7/2016 |
| KR | 10-1682233 B1 | 12/2016 |

OTHER PUBLICATIONS

Written Opinion of the International Searching Authority dated Apr. 1, 2019 in connection with International Patent Application No. PCT/KR2019/000023, 5 pages.

Notice of Preliminary Rejection dated Jun. 22, 2022 in connection with Korean Patent Application No. 10-2018-0002969, 9 pages.

* cited by examiner (a)            (b)

TECHNOLOGY AND METHOD FOR SELECTIVELY PROVIDING NETWORK FUNCTION TO APPLICATION OF DEVICE

CROSS-REFERENCE TO RELATED APPLICATIONS

This application is a 371 of International Application No. PCT/KR2019/000023 filed on Jan. 2, 2019, which claims priority to Korean Patent Application No. 10-2018-0002969 filed on Jan. 9, 2018, the disclosures of which are herein incorporated by reference in their entirety.

BACKGROUND

1. Field

This disclosure relates to a method for controlling network access right for an application in an electronic device and an electronic device operating the same.

2. Description of Related Art

Electronic devices such as laptops, mobile phones, smartphones, personal digital assistants (PDAs), tablet computers, e-books, wireless music players, personal media players (PMPs), portable gaming devices, and other similar portable terminals may provide communication services via a wireless communication network. As technology advances, a current electronic device may provide a number of additional features in addition to simple voice communications, and may include a wide variety of applications providing many different types of data communications and network services. For example, an electronic device may include an application that provides a user with a variety of data services, including access to social networks, social network services (SNSs), e-mail, messaging services, media content streaming including audio and video content, video communication services including teleconferencing and direct communication, remote data storage and access, various services such as network cloud services, and services for any application that may be included in an electronic device.

The plurality of applications that may be included in the electronic device may automatically connect to the wireless communication network and transceive information in a predetermined time and/or place, or without recognition or explicit execution of the user in any other suitable manner. Entering the hyper-connected society, modern people maintain the constant connectivity with the network. Accordingly, a boundary between individual life and work becomes ambiguous and fatigue therefrom keeps increasing for modern people.

In a related-art electronic device, a user is provided with a function such as a Do Not Disturb mode to mute a bell sound, a vibration, a notification, or the like, generated in the electronic device for a time designated by a user, so that the user may not confirm the notification unless the user actively confirms the device. The service, however, does not actively display a notification to a user, but if the user uses the electronic device for a specific task, there is a problem in that the user cannot help confirming the presence of the notification that the user does not wish to confirm.

Accordingly, there is necessity to secure right of not being connected to other people while maintaining usability of an electronic device.

The disclosure is to address the above-described problems, and an object of the disclosure is to provide a method and an electronic device for controlling a network access right of an application of an electronic device.

The disclosure provides a method for restricting a network access of specific applications which are not desired to be used while using usability of applications which are desired by a user to use in an electronic device by allowing network access right of the application, and an electronic device thereof.

SUMMARY

According to an embodiment, a method for controlling an electronic device may include receiving an input of a command for switching a mode of the electronic device to a blocking mode, based on a command for switching to the blocking mode being input, blocking a network access right of at least one application which has been preselected by a user from among a plurality of applications in the electronic device.

The receiving an input may include, based on a preset user command being input, displaying a user interface (UI) including a plurality of icons, and the command may be a command for selecting an icon for switching to the blocking mode from among a plurality of icons included in the UI.

A network access right for an application may be allowed except an application which has been preselected for blocking a network access right in the blocking mode among a plurality of applications in the electronic device.

The controlling method may include displaying on a display a user interface (UI) for selecting an application for blocking a network access right in the blocking mode, and receiving an input of a command for selecting an application for blocking a network access right in the blocking mode among the plurality of applications in the electronic device.

The blocking mode may include a preset condition for allowing an operating system to access a network connected to the electronic device and based on the preset condition being not satisfied, block network access of the preselected application, and the preset condition may include a consent on an access right of a user for an application to access a network connected to the electronic device.

The method may include, in a case where the preselected application is a call application, based on receiving a call from an external electronic device, transmitting, to the external electronic device, a prestored voice message.

The blocking may include, based on identification that the preselected application is a short message service (SMS) application and a received SMS is an urgent SMS, allowing network access right of the SMS application.

According to an embodiment, an electronic device includes a display, and a processor, and the processor may control the display to receive an input of a command for switching a mode of the electronic device to a blocking mode, and based on a command for switching to the blocking mode being input, block a network access right of at least one application which has been preselected by a user from among a plurality of applications in the electronic device.

The processor may, based on a preset user command being input, display a user interface (UI) including a plurality of icons, and the command may be a command for selecting an icon for switching to the blocking mode from among a plurality of icons included in the UI.

The processor may allow a network access right for an application except an application which has been preselected for blocking a network access right in the blocking mode among a plurality of applications in the electronic device.

The processor may display on a display a user interface (UI) for selecting an application for blocking a network access right in the blocking mode, and control the display to receive an input of a command for selecting an application for blocking a network access right in the blocking mode among the plurality of applications in the electronic device.

The processor may include a preset condition for allowing an operating system to access a network connected to the electronic device and based on the preset condition being not satisfied, block network access of the preselected application, and the preset condition may include a consent on an access right of a user for an application to access a network connected to the electronic device.

The electronic device may include a communicator, and the processor may, in a case where the preselected application is a call application, based on receiving a call from an external electronic device, controlling the communication to transmit, to the external electronic device, a prestored voice message.

The processor may, based on identification that the preselected application is a short message service (SMS) application and a received SMS is an urgent SMS, allow network access right of the SMS application.

An electronic device may provide a digital diet function by the electronic device without interference of a network provider.

The disclosure has an effect of providing a user with network disconnection without generating an additional hardware cost.

According to the disclosure, a user may use a desired function in an electronic device while blocking network of at least one application among a plurality of applications, thereby providing freedom for selection by a user.

DETAILED DESCRIPTION

Figure 1:
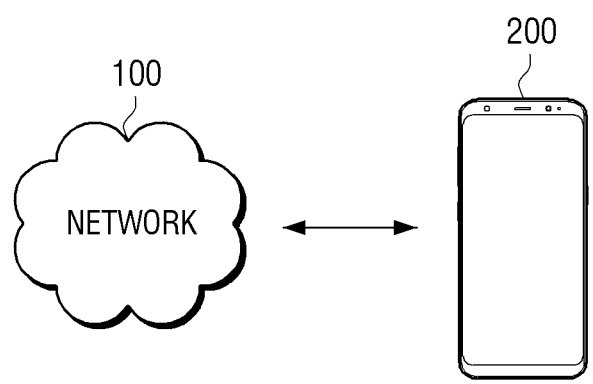
FIG. 1 is a diagram illustrating a system of an electronic device according to an embodiment.

Hereinafter, embodiments of the disclosure will be described with reference to the accompanying drawings. However, it may be understood that the disclosure is not limited to the embodiments described hereinafter, but also includes various modifications, equivalents, and/or alternatives of these embodiments. In relation to explanation of the drawings, similar drawing reference numerals may be used for similar constituent elements.

As used herein, the terms "first," "second," or the like may denote various components, regardless of order and/or importance, and may be used to distinguish one component from another, and does not otherwise limit the components.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

Hereinafter, embodiments of the disclosure will be described more fully with reference to the accompanying drawings, in which the embodiments of the disclosure are shown to understand a configuration and an effect of the disclosure. The disclosure may, however, be embodied and modified in many different forms and should not be construed as limited to the embodiments set forth herein. To more clearly describe features of the embodiments, detailed description for contents widely known to those skilled in the art will be omitted for clarity.

Unless otherwise described, any portion including any element may refer to the portion further including other elements, i.e., not excluding the other elements. Various elements and regions in the drawings may be schematically drawn. Accordingly, the technical concept(s) is not limited by a relative size or spacing drawn in the accompanying drawings.

In FIG. 1, an electronic device 200 is connected to a network 100 to transmit and receive data to and from the network 100. Although the electronic device 200 is implemented as a portable device such as a smartphone, the electronic device 200 is not limited thereto, and may be embodied in various types of devices having a display function, such as a personal computer (PC), a tablet PC, a portable multimedia player (PMP), a personal digital assistant (PDA), or the like.

If the electronic device 200 is implemented as a portable device, it may be implemented to have a touchscreen therein to execute a program using a finger or a pen (e.g., a stylus pen). Hereinafter, for convenience of description, the electronic device 200 is implemented as a portable device.

An operating system (OS) refers to a program that controls the hardware and software of a device to enable a user to use the electronic device 200. The OS may manage computer resources such as a central processing unit (CPU), a main memory unit, and an input/output device while serving as an interface between hardware and an application program. The operating system may include, for example, Android, Windows, Mac, Tizen, Unix, Linux, or the like.

An application refers to software developed to enable a user to perform a particular task using the electronic device 200. For example, there may be an e-mail application, a messenger application, a schedule management application, a document editing application, or the like. The application may be configured with instructions necessary to perform a particular task. The instructions constituting the application may be different from each other, in accordance with a type of the OS. For example, a first messenger application configured to be executed on a first OS may not be executed in a second OS.

Notification or alarm may occur when an event occurs in an application installed on a device. The event may include, for example, that new data is obtained or received in an application running on the device or a task being processed in the application is completed, but this is only one embodiment, and the event is not limited thereto. According to another example, updating a version of the application may also be an example of an event. The notification may be output to the device in the form of at least one of text, image, video, sound, or the like.

The electronic device 200 may be connected to the network 100 to transmit and receive data. A plurality of applications which the electronic device 200 include may access a network connected through a communicator of the electronic device 200 to receive various data required in the operation of the respective applications.

The electronic device 200 may be connected to the network 100 through a communicator, and the processor of the electronic device 200 may allow an application to access data received through the network 100. The processor may determine whether the application satisfies a condition that the application may access the network through an operating system (OS) which is based on the application. More specifically, the OS may drive an application with a condition of access right consent from a user for information (e.g., contact, schedule, image, communication content, bio-information, etc.) stored in the electronic device 200 and information automatically stored in the use of the electronic device 200 (e.g., location information, communication records, authentication information, physical activity records, etc.).

The OS is an "execution manager" which is a part of a computer system that manages all hardware and all software and may include a process manager, a main memory unit manager, a file manager, and a device manager. The OS may allow network limitations of the application if the user of the electronic device 200 agrees to the application's network access right. That is, the process manager may assign the CPU for the application to the process and determine the transition (ready, run, standby) of the application. In this example, a fixed partition multiprogramming (FPM) may be used, or a variable partition multiprogramming (VPM) may be used for an assignment method. The process manager of the OS may prepare the necessary registers and tables if it is determined that the application is in an execution transition state. The main memory unit manager of the OS may assign a main memory unit in an empty space when execution of the application stored in the main memory unit (e.g., readonly memory (ROM), random access memory (RAM), etc.) through the table is a legitimate request through the user's network access right consent.

That is, when the processor satisfies user consent, which is a condition for network access right according to the setting of each application in the OS, the processor may be implemented so that the application may access the network and run. Accordingly, the processor may control so that the application may access the network if the user consent condition for the network access right of the application is satisfied on the OS, and conversely, if the user consent condition for the network access right is not satisfied, the processor may limit the network access of the application.

The user may select at least one application such that a particular application among a plurality of applications in the electronic device 200 is subject to a user's consent to the network access right as an execution condition in the OS. The electronic device 200 may be implemented such that an application selected by the user is subject to the user's consent to network access right in a particular mode as an execution condition, and in other modes the user is considered to permit the network access. A detailed operation of the selection of the application and the switching of the mode of the electronic device 200 will be described later.

Figure 2:
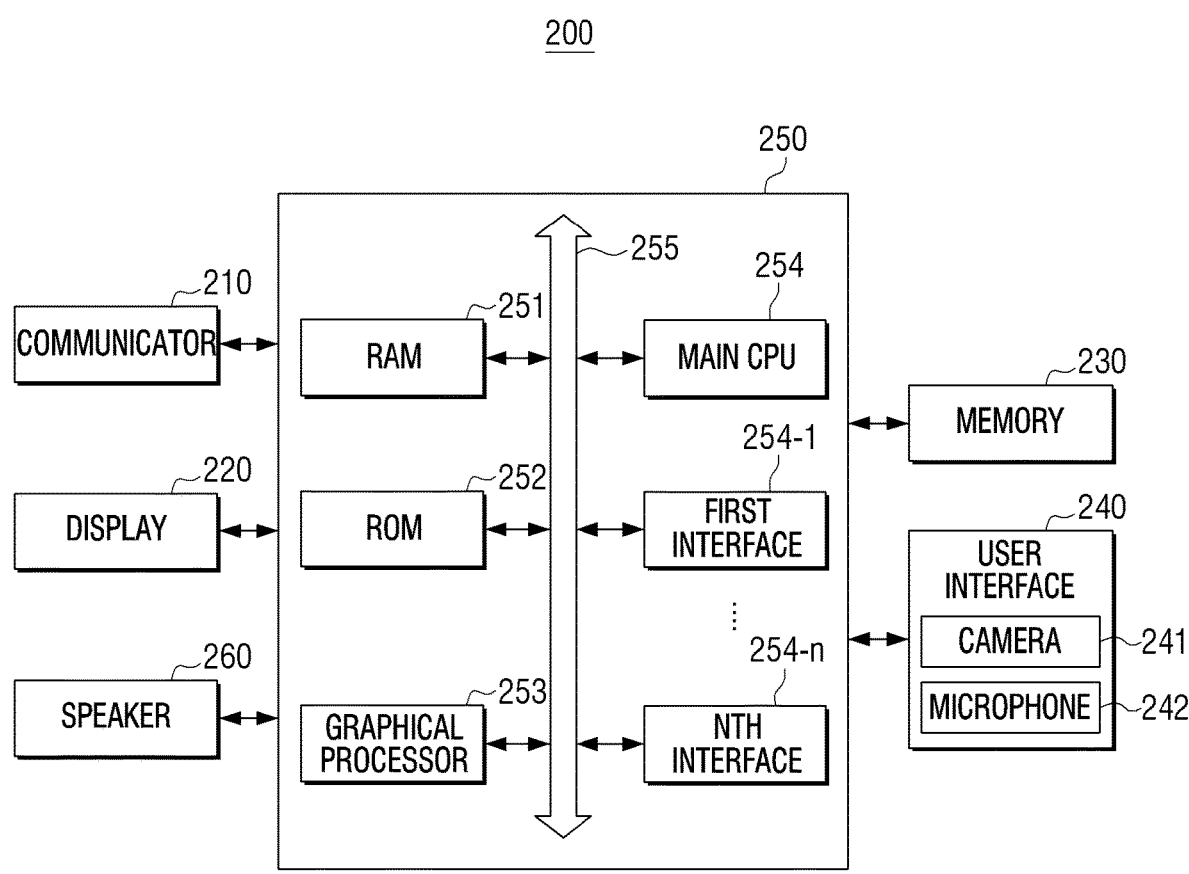
FIG. 2 is a block diagram illustrating a configuration of an electronic device according to an embodiment.

As illustrated in FIG. 2, the electronic device 200 may include a communicator 210, a display 220, a memory 230, a user interface unit 240, a processor 250, and a speaker 260. The user interface unit 240 may include a camera 241 and a microphone 242, and the processor 250 may include a RAM unit 251, a ROM 252, a graphics processor 253, a main CPU 254, a first interface 254-1 to a $n^{th}$ interface 254-n, and a bus 255 connecting each configuration.

The communicator 210 is configured to communicate with various types of external devices or external servers according to various types of communication methods. In particular, the communicator 210 may establish a connection with the network 100 provided by a network provider. When the electronic device 200 does not turn off the communicator 210, the communicator 210 may maintain the connection so that the network 100 may transmit and receive data without explicit execution of the user.

The communicator 210 may include a Wi-Fi chip, a Bluetooth chip, a wireless communication chip, or the like. The Wi-Fi chip, Bluetooth chip, a near field communication (NFC) chip each may communicate with a Wi-Fi method, a Bluetooth method, and an NFC method. The NFC chip refers to a chip operating in a NFC mode using 13.56 MHz band among various radio frequency identification (RF-ID) frequency bands such as 135 kHz, 13.56 MHz, 433 MHz, 860 to 960 MHz, 2.45 GHz, or the like. When the Wi-Fi chip or the Bluetooth chip is used, various connection information such as a service set identifier (SSID) and a session key may be transmitted and received first, and communication information may be used to transmit and receive various information. The wireless communication chip refers to a chip that performs communication according to various communication standards such as IEEE, Zigbee, 3rd Generation (3G), Third Generation Partnership Project (3GPP), Long Term Evolution (LTE), or the like.

The display 220 is configured to display applications and content that the electronic device 200 includes. The display 220 may also function as an inputter for receiving an input command of the user. The display 220 may display a user interface (UI) for selecting an application requiring user consent for network access right, and may display a UI for entering a user command to switch to a particular mode.

The display 220 may be implemented as any of various types of a display such as, for example, and without limitation, a liquid crystal display (LCD), an organic light emitting diode (OLED) display, or the like, but is not limited thereto. The display 220 may be implemented as a flexible display, a transparent display, or the like. The display 220 according to an embodiment may include a display panel for outputting an image and a bezel for housing a display panel. In particular, the bezel according to an embodiment may include a touch sensor (not shown) to sense a user interaction.

The memory 230 may store various data for overall operation of the electronic device 200, such as a program for processing or controlling the processor 250. The memory 230 may store a number of application programs (application programs or applications) running on the electronic device 200, data for the operation of the electronic device 200, instructions, or the like. At least some of these applications may be downloaded from an external server via wireless communication. At least some of these applications may be present on the electronic device 200 from the release for a basic function of the electronic device 200. The application program may be stored in the memory 230 and may be driven by the processor 250 to perform an operation (or a function) of the electronic device 200.

The memory 230 may be implemented, for example, as a non-volatile memory, a volatile memory, a flash memory, a hard disk drive (HDD), a solid state drive (SSD), or the like. The memory 230 may be accessed by the processor 250 and reading/writing/modifying/deleting/updating of data by the processor 250 may be performed. The term memory may include a memory 230, a read only memory (ROM) 251 in the processor 250, a random access memory (RAM) 252, or a memory card (not shown) (e.g., a micro secure digital (SD) memory card, a memory stick) mounted to the electronic device 200. The memory 230 may also include a buffer to temporarily store various data of music content. The memory 230 may store programs and data for configuring various screens to be displayed on a display area of the display 220.

The processor 250 is configured to control overall operation of the electronic device 200. The processor 250 may control the overall operation of the electronic device 200 using various programs stored in the memory 230 of the electronic device 200.

The processor 250 may include a CPU 254, a RAM 251, a ROM 252, and a system bus 255. The ROM 252 is configured to store a set of commands for system booting, and the CPU 254 copies the operating system stored in memory 230 of the electronic device 200 to the RAM 251 according to instructions stored in the ROM 252, and executes the operating system to boot the system.

The processor 250 may determine whether to satisfy conditions for performing the operation of the application including the executed operating system. When a condition for executing an application is satisfied, the CPU 254 included in the processor 250 may copy the various applications stored in the memory 230 to the RAM 251 and execute various operations based on the operating system. More specifically, a condition for an application to be executed may include an access right consent from a user for information stored in the electronic device 200 and information stored automatically in the use of the electronic device 200, and may include a user's access right consent for the application to access the network.

If it is determined that the application execution condition including the operating system is not satisfied, the processor 250 may block the application from being executed based on the operating system. In this example, the processor 250 may execute the application through the operating system within a limit that the execution condition of the application is satisfied. For example, if an application sets contact access right consent and network access right consent to run conditions in the operating system, if the user agrees only contact access right and does not consent on the network access right, the processor 250 may control the application to perform in the operating system for execution using the contact, and not to perform in the operating system for execution associated with the network access.

According to an embodiment, the processor 250 may include only one CPU, but in implementation, the processor 250 may be implemented with a plurality of CPUs (a digital signal processor (DSP), a system on chip (SoC), or the like). According to an embodiment, the processor 250 may include only one CPU, but in implementation, the processor 250 may be implemented with a plurality of CPUs (a digital signal processor (DSP), a system on chip (SoC), or the like). According to an embodiment, the processor 250 may be implemented as a digital signal processor, a microprocessor, and a timing controller (TCON) which process a digital video signal, but this is not limited thereto. The processor 250 may include one or more among a central processing unit (CPU), a micro controller unit (MCU), a micro processing unit (MPU), a controller, an application processor (AP), a communication processor (CP), an advanced reduced instruction set computing (RISC) machine (ARM) processor, an artificial intelligence (AI) processor or may be defined as a corresponding term. The processor 250 may be implemented with system on chip (SoC) type or a large scale integration (LSI) type which a processing algorithm is built therein or in a field programmable gate array (FPGA) type.

As described above, the communicator 210 of the electronic device 200 may maintain a connection with the network 100 and transceive data with a network 100 without an explicit command of the user. The data received through the communicator 210 may be a trigger signal for a particular application or may be periodic update data of the application. However, in a specific mode (hereinafter referred to as a beeper mode for convenience of description), the electronic device 200 may determine that the user does not consent on the network access of the application with respect to the network 100 connected to the communicator 210 and block the network access of the application.

Figure 3:
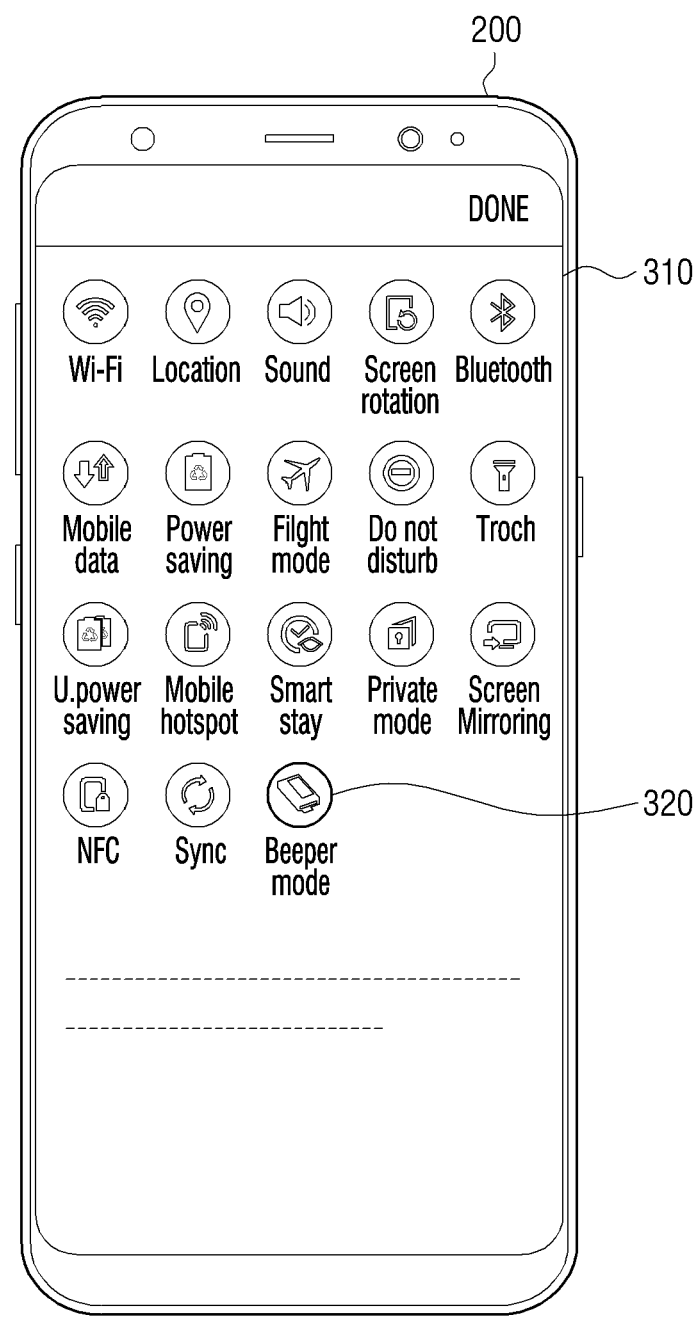
FIG. 3 is a diagram illustrating a user interface (UI) for switching to a beeper mode according to an embodiment.

The display 220 may display a UI 310 for controlling the electronic device 200 as shown in FIG. 3. If a user command to select an icon 320 for switching from among a plurality of control icons included in the UI 310 to a beeper mode is input, the electronic device 200 may switch the mode to the beeper mode. As described above, it is described that the user selects an icon of the UI as an input for the electronic device 200 to be switched to the beeper mode, but the embodiment is not limited thereto. The electronic device 200 may be switched to the beeper mode by receiving a user voice or may be automatically switched to a beeper mode periodically at a specific time zone preset by the user. For example, the user may set to automatically switch to the beeper mode in order to be free from a task while having a date on a regular basis.

If the electronic device 200 is switched to the beeper mode, the electronic device 200 may determine that the network access consent of the application which is the condition included in the OS is not satisfied, and may block the network access right of the application.

Figure 4:
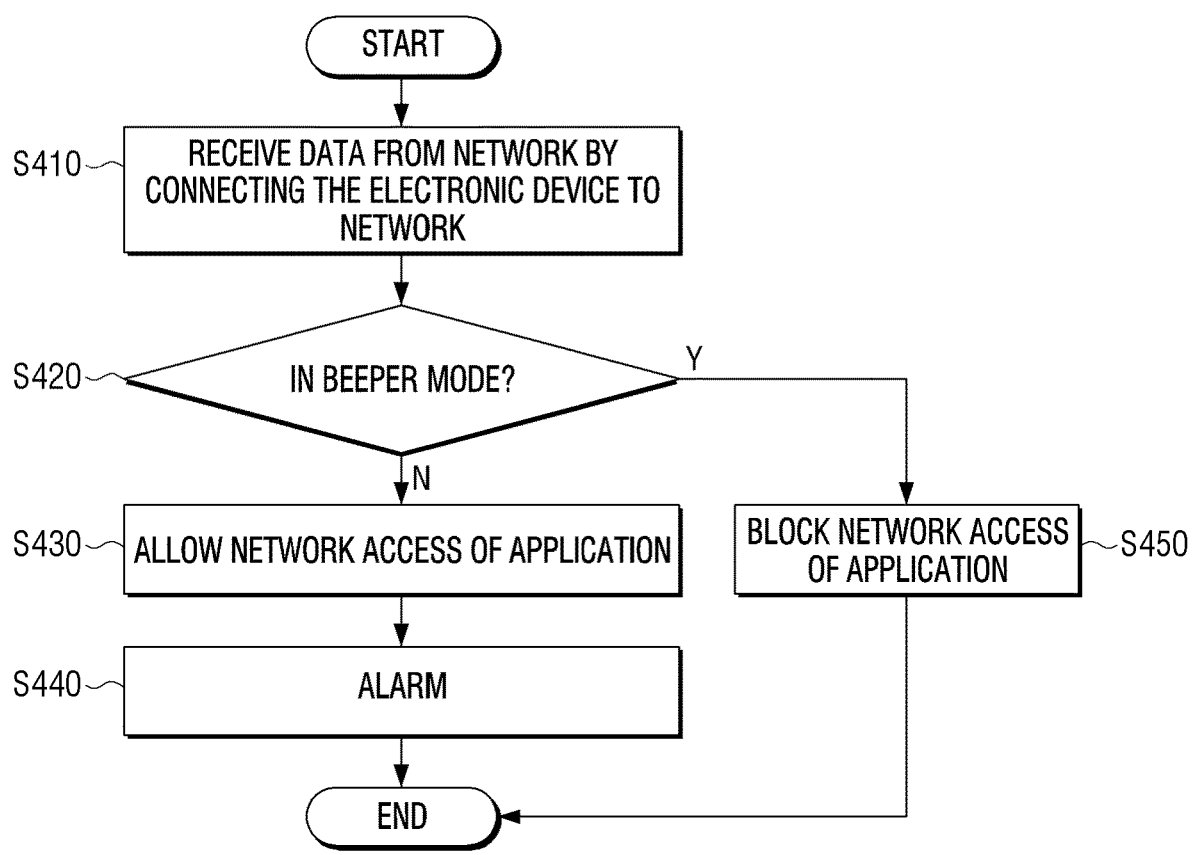
FIG. 4 is a flowchart illustrating a process of blocking network of an application in a beeper mode according to an embodiment.

Referring to FIG. 4, the electronic device 200 may establish a connection with the network 100 when the hardware power of the communicator 210 is not off, and may receive data related to the application from the network 100 in operation S410. When the mode of the electronic device 200 is not a beeper mode in operation S420-N, the electronic 200 may determine that the network access right of the application included in the electronic device 200 is allowed, and may allow the application to access the network in operation S430. The processor 250 of the electronic device 200 may determine that the user's consent, which is the network access permission condition of the application, has been satisfied, and may control the application to normally access the network and transmit and receive data through the OS. In this example, the application may access the network to process the received data, and provide the result of the processing to the user via a push, pop-up, etc. to the display 220 in operation S440. If the mode of the electronic device 200 is the beeper mode in operation S420-Y, the electronic device 200 may determine that the application has no consent to access the network, and may block the network access right of the application in operation S450.

Figure 5:
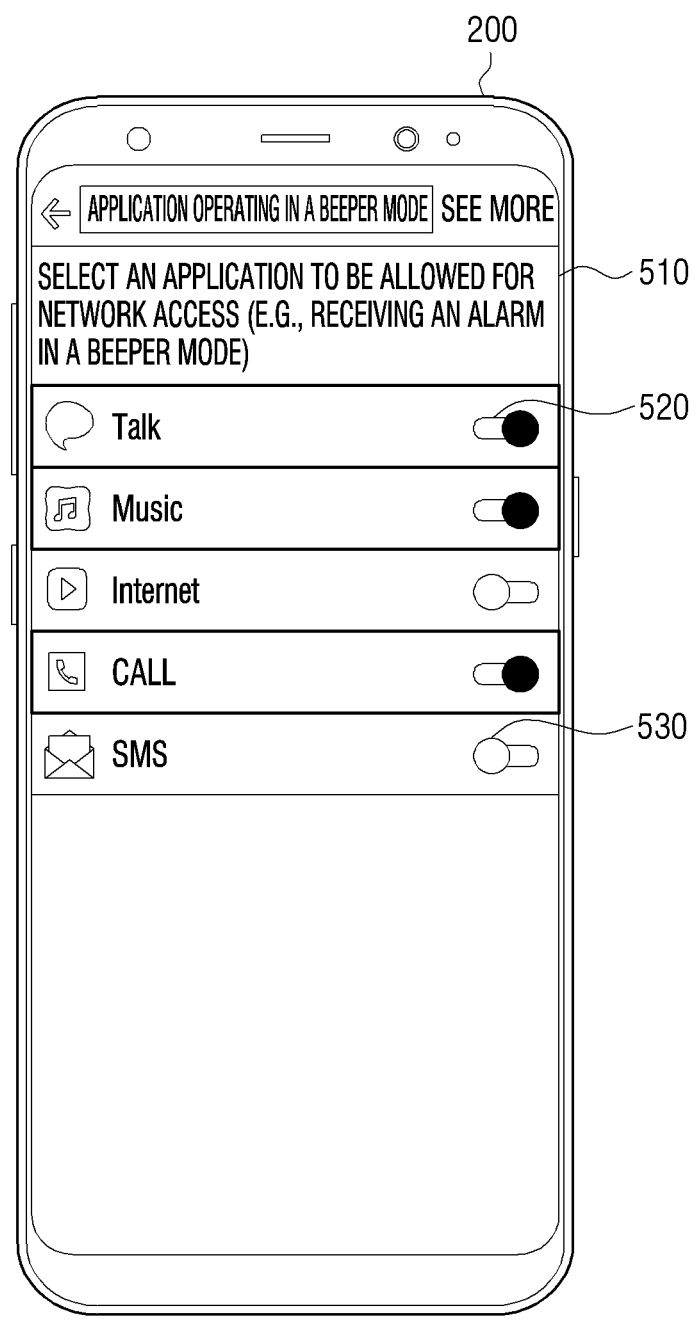
FIG. 5 is a diagram illustrating a UI for selecting an application for blocking network connection in a beeper mode according to an embodiment.

The electronic device 200 may pre-select an application for blocking network access right in a beeper mode. That is, if the electronic device 200 is not in the beeper mode, all applications may access the network to provide an alarm to the user, and the user may increase the usability of the user by blocking access to the network only for the application selected by the user in the beeper mode. As illustrated in FIG. 5, the electronic device 200 may display a UI 510 to the display 220 for selecting an application to block in a beeper mode. Specifically, when a user's command for selecting a plurality of icons 520 and 530 included in the UI 510 is input, the electronic device 200 may switch whether to block a network access right of the application corresponding to the selected icon.

For example, referring to FIG. 5, the icon 520 corresponding to the talk application shows that the talk application has been set to allow access to the network in a beeper mode, and the icon 530 corresponding to the SMS Application has been set to allow the SMS application to be blocked from accessing the network in the beeper mode. That is, when an icon corresponding to a plurality of applications is selected, as illustrated in FIG. 5, the electronic device 200 may determine that the user has a consent to access the network in the beeper mode, thereby allowing access to the network through the OS. The electronic device 200 may determine that there is no user consent to the network access in the beeper mode for the Internet and SMS application, and may block access to the network via the OS.

Figure 6:
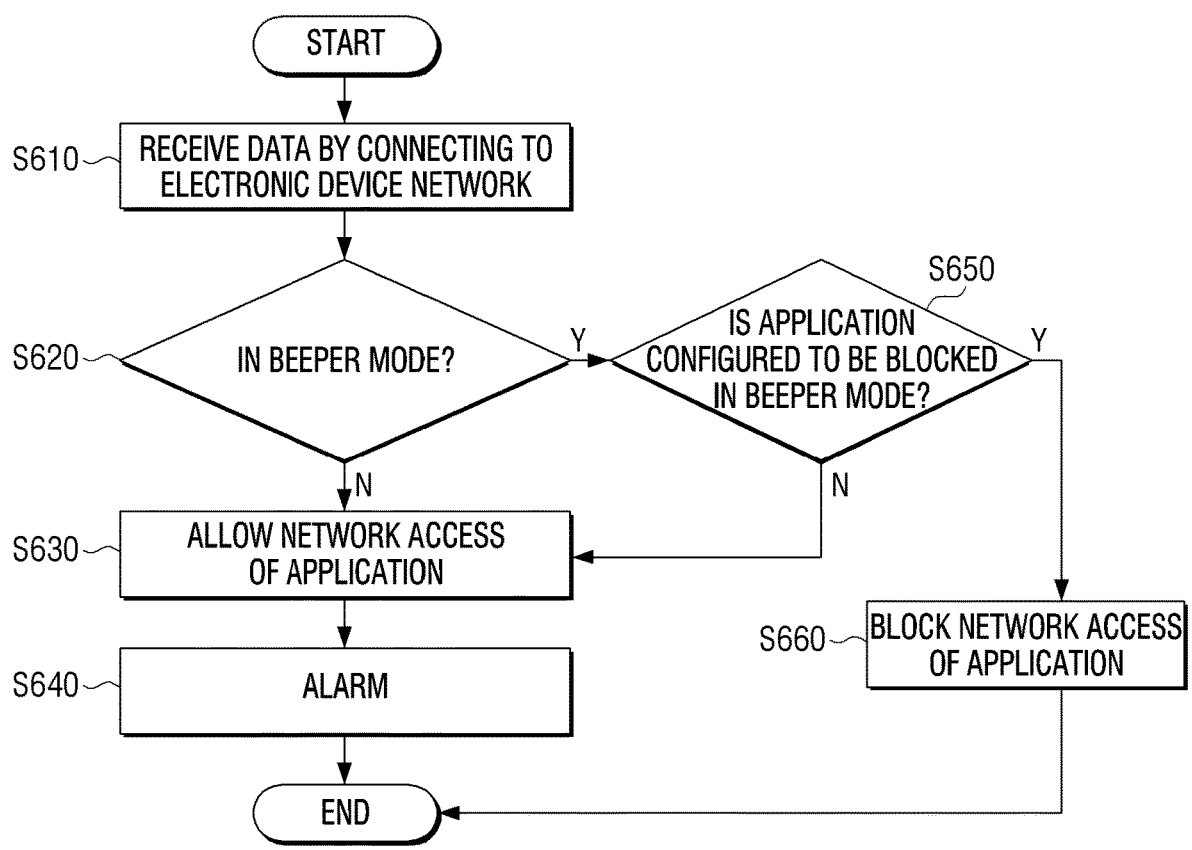
FIG. 6 is a flowchart illustrating a process for blocking network of an application in a beeper mode according to an embodiment.

Specifically, referring to FIG. 6, the electronic device 200 may be connected to the network 100 to receive data related to each application in operation S610, and the electronic device 200 may check whether the electronic device 200 is in a beeper mode in operation S620. If it is determined that the mode of the electronic device 200 is not the beeper mode in operation S620-N, the electronic device 200 may determine that there is user consent to the network access right for all applications and allow access to the network via the OS in operation S630. The electronic device 200 may inform the user of the result of processing of the application accessing the network through the OS in operation S640. If it is determined that the mode of the electronic device 200 is in a beeper mode in operation S650, the electronic device 200 may determine whether each application is an application selected by a user to block access to the network in a beeper mode in operation S650. The electronic device 200 may determine that a specific application is an application selected by the user so that the application does not block the application from accessing the network in the beeper mode in operation S650-N, and may allow the application to access the network by determining that the user consents the application to access the network and may allow the application to access the network in operation S630. In this example, the electronic device 200 may inform the user of the result of processing of the application accessing the network through the OS in operation S640. If the electronic device 200 determines that a specific application is an application selected by the user to block the application from accessing the network in the beeper mode in operation S650-Y, the electronic device 200 may determine that the user has not consented on accessing the network and may block the application from accessing the network in operation S660.

According to the above-described embodiment, the user may select the electronic device 200 from accessing the network in a beeper mode for a specific application, and then switch to a beeper mode so that only a desired application may be used without interruption of a specific application. According to an embodiment, there is an effect that a user may avoid pressure received from an alarm of an undesired application while maintaining usability of a user for the electronic device 200.

Figure 7A:
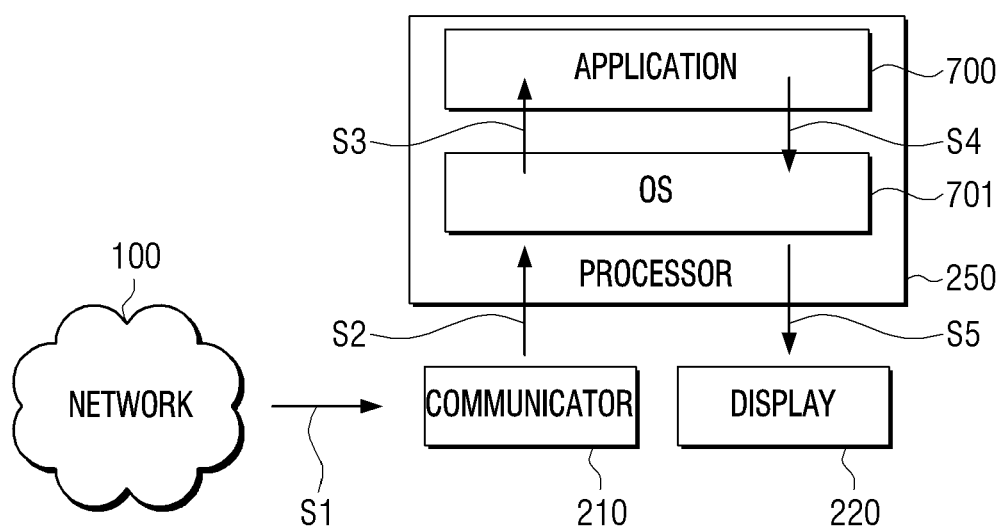
FIGS. 7A, 7B and 7C are diagrams illustrating flow of data in a beeper mode and in a non-beeper mode according to an embodiment.

FIG. 7 is a block diagram for intuitive understanding of the embodiment described above. FIG. 7A illustrates the flow of data within the electronic device 200 when the mode of the electronic device 200 is not in a beeper mode. The communicator 210 of the electronic device 200 may receive data from the network 100 (referred to as S1 for convenience of description). The processor 250 may determine whether the data received through the communicator 210 satisfies a condition that an application 700 corresponding to the data can be driven in an OS 701 (referred to as S2 for convenience of description). If it is determined that a condition for driving the application 700 in the OS 701 is satisfied, the processor 250 may allow a network access of the application 700 (referred to as S3 for convenience of description), and may control the application 700 to be driven on the OS. The application 700 may perform tasks on the basis of the OS 701 and transmit the results to the OS 701 (referred to as S4 for convenience of description). Based on the received data, the processor 250 may control the application 700 to display the result of executing at the OS 701 through a push alarm in the display 220 (referred to as S5 for convenience of description). Accordingly, the user may be provided with an alarm on the execution result of the application 700 through the display 220.

Figure 7B:
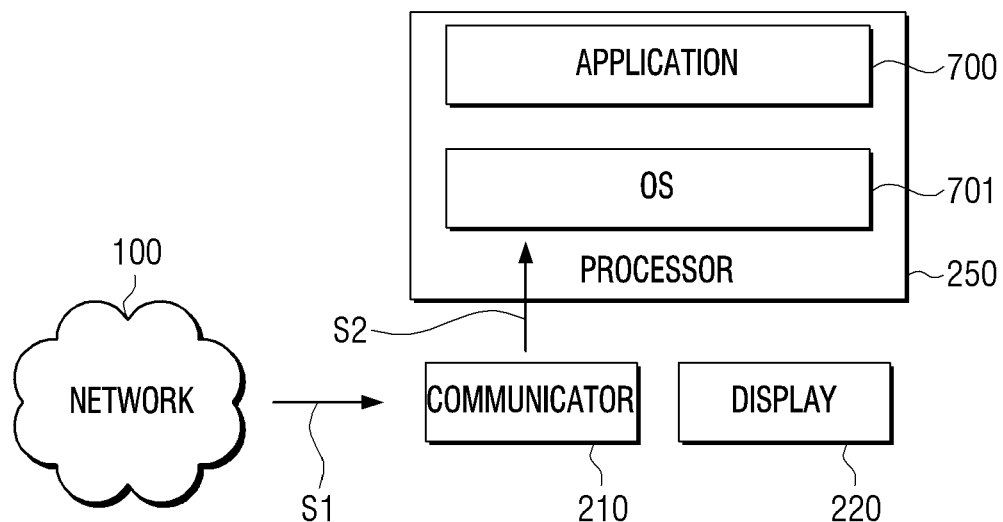

According to the embodiment of the beeper mode, the processor 250 of the electronic device 200 may block the execution of the selected application in the OS 701 based on the data received for the application such that the network is blocked in the beeper mode. Referring to FIG. 7B, the communicator 210 is connected to the network 100 to receive data in operation S1, and the processor 250 may determine whether the application 700 corresponding to the received data satisfies a condition for execution in the OS 701 in operation S2. The processor 250 may determine that the application 700 has no user's consent to the network access right, which is a condition for executing the application 700 in the OS 701, and may block the network access of the application 700. That is, in the example where the electronic device 200 is in the beeper mode, as illustrated in FIG. 7B, only steps S1 and S2 may be performed, and the application 700 may not perform a task related to the data.

Figure 7C:
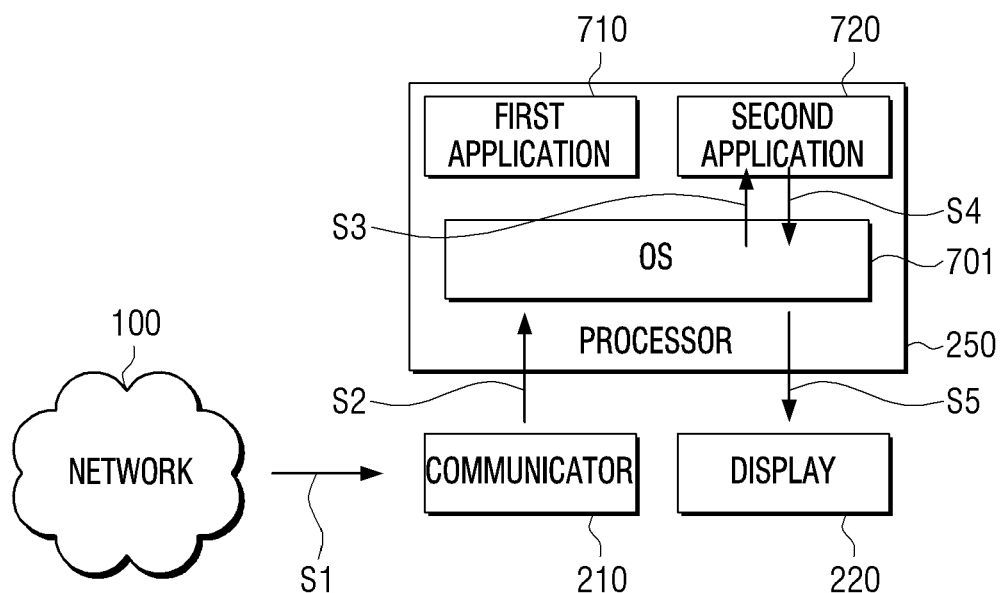

According to one embodiment, the electronic device 200 may allow a network to be blocked in a beeper mode only for some applications among a plurality of applications. Referring to FIG. 7C, the first application 710 is an application selected by the user so that the network is blocked in the beeper mode, and the second application 720 is an application set so as not to be blocked. The communicator 210 may be connected to the network 100 to receive data in operation S1. In this example, the processor 250 may determine that there is no consent of a user which is the condition for the first application 710 to be driven on the OS 701 for the network access right in operation S2, and may block the network connection of the first application 710. The processor 250 may determine that the user consent for the network access right, which is a condition for driving on the OS, is satisfied for the second application 720 in operation S2. The processor 250 may allow the second application 720 to access the network in operation S3, and based on the result of executing the second application 720 on the OS 701 in operation S4, the processor 250 may display an alarm on the display 220 in operation S5. That is, the user may use the second application 720 while blocking the alarm on the execution result of the first application 710.

Related-art electronic devices provide a Do Not Disturb mode and an flight mode to block alarm of an application which the user does not want. FIG. 8 is a diagram illustrating a difference between the embodiment and the Do Not Disturb mode and the flight mode.

Figure 8A:
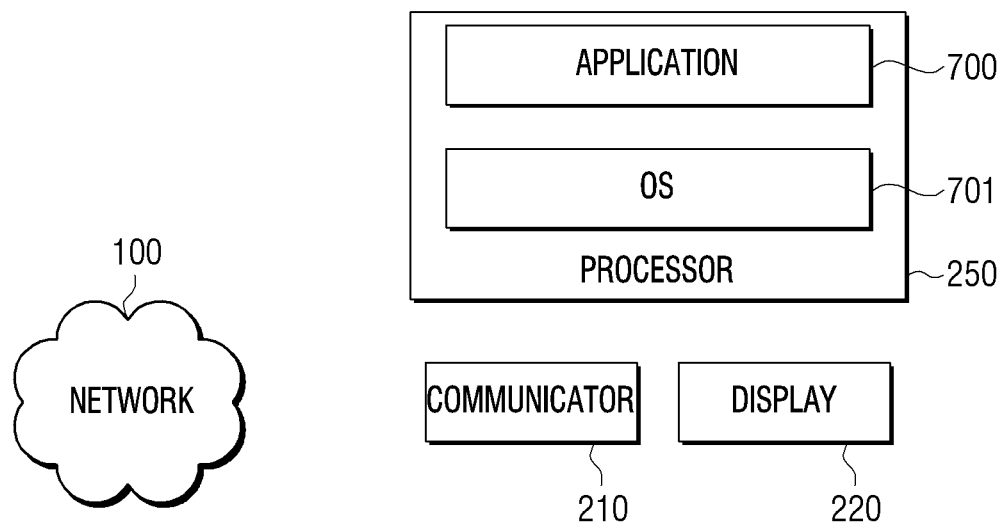
FIGS. 8A and 8B are diagrams illustrating that the flight mode and the Do Not Disturb modes of FIGS. 8A and 8B are different from the embodiment of the disclosure.

FIG. 8A illustrates a related-art flight mode. Before switching to the flight mode, the electronic device 200 may provide the execution result of the application to the user via a push alarm to the display 220, as shown in FIG. 7A. When the electronic device 200 switches to the flight mode, the electronic device 200 may block the connection with the network 100 by turning off the power of the hardware of the communicator 210. Accordingly, the electronic device 200 may not receive any data from the network 100.

Figure 8B:
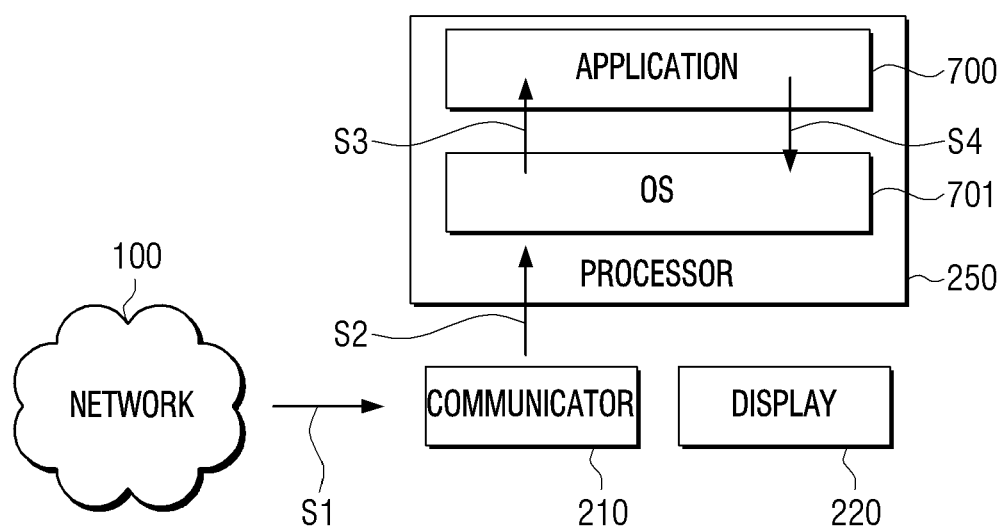

FIG. 8B illustrates the related-art Do Not Disturb mode. The electronic device 200 may provide the execution result of the application to the user via a push alarm, as shown in FIG. 7A, before switching to the Do Not Disturb mode. In this example, if the electronic device 200 switches to the Do Not Disturb mode, the processor 250 may still control the application 700 to execute the data received over the network in the OS 701. However, in the Do Not Disturb mode, the processor 250 may control the push alarm about the execution result of the application 800 to not be displayed on the display 220 in operations S1, S2, S3, and S4.

In the Do Not Disturb mode, the electronic device 200 may not provide only a push alarm for a result of receiving data and executing on the OS by the application, but the electronic device 200 may keep providing an indicator to a user using the electronic device 200. The difference with the beeper mode will be described with reference to FIG. 9.

Figure 9A:
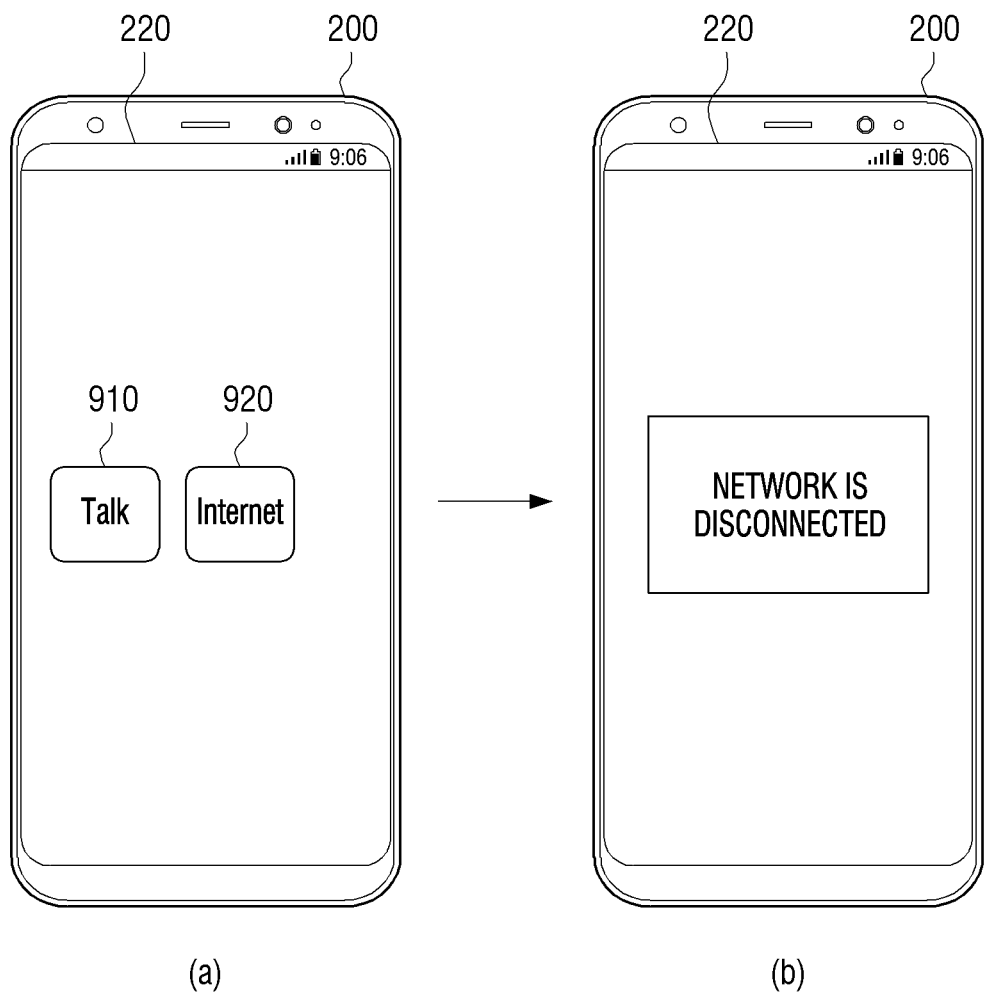
FIG. 9 is a diagram illustrating that the Do Not Disturb mode is different from the embodiment of the disclosure.
Figure 9B:
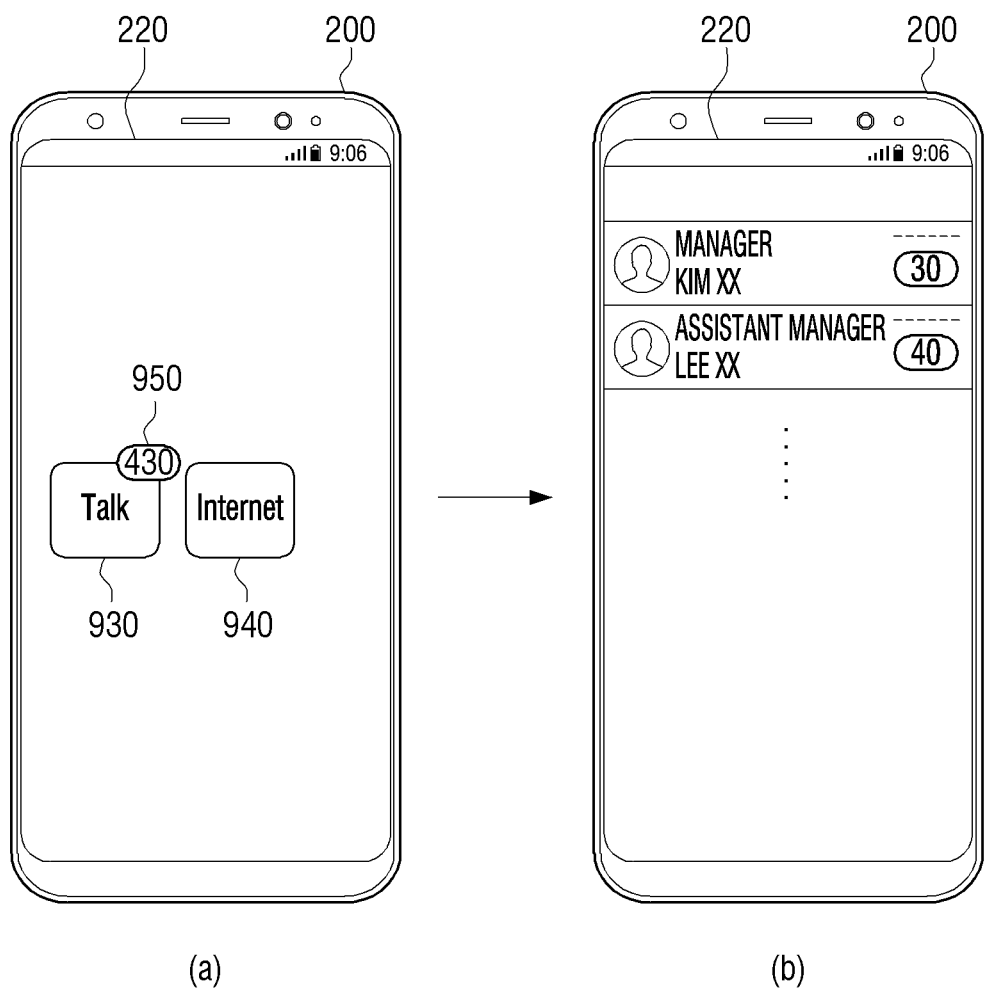

For example, FIG. 9A illustrates a screen of the display 220 in the beeper mode, and FIG. 9B illustrates a screen of the display 220 in the Do Not Disturb mode. In FIG. 9A, it is assumed that the user sets a talk application 910 to block the network access in the beeper mode. Accordingly, the electronic device 200 may block the network access of the talk application 910 and prevent the talk application 910 from executing the data on the OS. Accordingly, even if the user uses the electronic device 200 to use an Internet application 920 in the beeper mode, the electronic device 200 may not display any indicator in the talk application 910 as shown in FIG. 9A. The electronic device 200 may display an indicator indicating that network is disconnected as shown in FIG. 9A, even though the user receives a command for selecting the talk application 910. The electronic device 200 may provide an effect of removing a pressure a user may feel from the talk application 910 through a beeper mode.

Referring to FIG. 9B, even when the user uses the electronic device 200 to use the Internet application 940 in a Do Not Disturb mode, the electronic device 200 may display an indicator 950 for the performance results of a talk application 930 that did not indicate a push alarm. That is, when the user inputs a command for selecting the talk application 930, the electronic device 200 may provide the result of performing by talk application 930 through the OS, as shown in FIG. 9B. Accordingly, the user may feel the pressure from the talk application 930 in the Do Not Disturb mode, and the user may not sufficiently receive the network disconnection effect.

It may be a case that the electronic device 200 allows access to the network even if it is an application that is selected to block the network in the beeper mode. For example, if the SMS application is selected to block the network access in the beeper mode and the electronic device 200 is in the beeper mode, if the electronic device 200 determines that the SMS data received from the network 100 through the communicator 210 is an emergent SMS (e.g., a disaster SMS), the electronic device 200 may allow the SMS application to access the network.

The processor 250 may extract a character string from the received SMS data and determine that the received SMS is an emergent SMS if the extracted character string matches the character string previously stored in the memory 230. For example, if the memory 230 stores a character string of "emergency," "disaster," "newsflash," or the like, and the processor 250 includes the character string "disaster" in the string extracted from the SMS data, the processor 250 may determine that the SMS application accesses the network by assuming that the user consent condition for the network access that the operating system contains is satisfied. In this example, the electronic device 200 may allow to perform the SMS application based on the OS to provide the user with a push alarm for the SMS application.

In the above-described embodiment, it is illustrated that the processor 250 extracts the character string from the received data, but the processor 250 may extract the code tagged in the meta data of the received data and determine that it is urgent data.

If the application selected to block the network in the beeper mode is a call application, the electronic device 200 may transmit a pre-stored message to the memory 230 to the other electronic device. For example, if a call connection is attempted from a counterpart electronic device when a call application is blocked from accessing a network in a beeper mode, the electronic device 200 may transmit a call disconnection message such as "the phone is power off and cannot receive a call" or transmit a recorded voice message "now I'm under rest, I will call back".

Through the embodiment, the counterpart may recognize that the user of the electronic device 200 does not want to have a call and unnecessary additional call connection may not be attempted.

An apparatus (e.g., modules or display device 200) or a method (e.g., operations) according to various embodiments may be performed by at least one computer (e.g., a processor) executing instructions included in at least one of the programs maintained in, for example, computer-readable storage media.

When the instruction is executed by a computer (e.g., a processor), the at least one computer may perform a function corresponding to the instruction. The computer readable storage medium may be, for example, the memory 230.

The program may be included in a computer-readable recording medium including a hard disk, a floppy disk, and a magnetic media (e.g., magnetic tape); an optical media such as a compact disk read only memory (CD-ROM) or a digital versatile disk (DVD); a magneto-optical medium such as a floptical disk; and a hardware device, such as a ROM, a random access memory (RAM), a flash memory, or the like. In this example, the storage medium is typically included as a part of the configuration of the electronic device 200, but may be mounted through a port of the electronic device 200, or may be included in an external device (e.g., a cloud, server, or other electronic device) located outside of the electronic device 200. The program may also be stored in a plurality of storage media, wherein at least a portion of the plurality of storage media may be located on an external device of the electronic device 200.

The instructions may include machine language code produced by a compiler, as well as high-level language code that may be executed by a computer using an interpreter or the like. The hardware devices described above may be configured to operate as one or more software modules to perform the operations of the various embodiments, and vice versa.

Also, the description of the embodiments of the disclosure is intended to be illustrative, and not to limit the scope of the claims, and many alternatives, modifications, and variations will be apparent to those skilled in the art. While one or more embodiments have been described with reference to the figures, it will be understood by those of ordinary skill in the art that various changes in form and details may be made therein without departing from the spirit and scope as defined by the following claims and their equivalents.

What is claimed is:

1. A method for controlling an electronic device, the method comprising:
    displaying a plurality of user interfaces including a plurality of application icons;
    receiving an input of a command for selecting an icon from among the plurality of application icons included in the user interfaces for automatically switching a mode of the electronic device to a blocking mode at a specific time zone and a specific location set by a user;
    based on a command for automatically switching to the blocking mode being input, identifying a current time and a location of the electronic device; and
    based on identification of the current time and the location of the electronic device, blocking a network access right of at least one application which has been preselected by the user from among the plurality of applications in the electronic device at the specific time zone and the specific location set by the user, wherein the method for controlling the electronic device further comprises:
        extracting a code tagged in metadata and a character string from data of a received message based on an identification that the preselected at least one application is a message application;
        identifying the received message is an urgent message based on the extracted code tagged in the metadata and the character string; and
        allowing network access of the message application based on the identification that the received message is the urgent message.

2. The method of claim 1, wherein a network access right for an application is allowed except an application which has been preselected for blocking a network access right in the blocking mode among the plurality of applications in the electronic device.

3. The method of claim 1, further comprising:
    displaying on a display a user interface (UI) for selecting an application for blocking a network access right in the blocking mode; and
    receiving an input of a command for selecting an application for blocking a network access right in the blocking mode among the plurality of applications in the electronic device.

4. The method of claim 1, wherein the blocking mode comprises a preset condition for allowing an operating system to access a network connected to the electronic device and based on the preset condition being not satisfied, block network access of the preselected at least one application, and
    wherein the preset condition comprises a consent on an access right of the user for an application to access the network connected to the electronic device.

5. The method of claim 1, further comprising:
    in a case where the preselected at least one application is a call application, based on receiving a call from an external electronic device, transmitting, to the external electronic device, a prestored voice message.

6. An electronic device comprising:
    a display; and
    a processor,
    wherein the processor is further configured to:
        control the display to display a plurality of user interfaces including a plurality of application icons,
        control the display to receive an input of a command for selecting an icon from among the plurality of application icons included in the user interfaces for automatically switching a mode of the electronic device to a blocking mode at a specific time zone and a specific location set by a user, and
        based on command for automatically switching to the blocking mode being input, identify a current time and a current location of the electronic device,
        based on the identification of the current time and the location of the electronic device, block a network access right of at least one application which has been preselected by the user from among the plurality of applications in the electronic device at the specific time zone and the specific location set by the user,
    wherein the processor is further configured to:
        extract a code tagged in metadata and a character string from data of a received message, based on an identification that the preselected at least one application is a message application;
        identify the received message is an urgent message based on the extracted code tagged in the metadata and the extracted character string; and
        allow network access of the message application based on the identification that the received message is the urgent message.

7. The electronic device of claim 6, wherein the processor is further configured to allow a network access right for an application except an application which has been preselected for blocking a network access right in the blocking mode among the plurality of applications in the electronic device.

8. The electronic device of claim 6, wherein the processor is further configured to display on the display a user interface (UI) for selecting an application for blocking a network access right in the blocking mode, and control the display to receive an input of a command for selecting an application for blocking a network access right in the blocking mode among the plurality of applications in the electronic device.

9. The electronic device of claim 6, wherein the processor is further configured to:
    include a preset condition for allowing an operating system to access a network connected to the electronic device and based on the preset condition being not satisfied, block network access of the preselected at least one application, and
    wherein the preset condition comprises a consent on an access right of a user for an application to access the network connected to the electronic device.

10. The electronic device of claim 6, comprising:
a communicator, wherein the processor is further configured to, in a case where the preselected at least one application is a call application, based on receiving a call from an external electronic device, controlling the communication to transmit, to the external electronic device, a prestored voice message.

\* \* \* \* \*